(12) United States Patent
Schilb et al.

(10) Patent No.: US 6,375,178 B1
(45) Date of Patent: Apr. 23, 2002

(54) DUAL CYLINDER WORK PIECE POSITIONER

(75) Inventors: Christopher J. Schilb, Bettendorf; Jan Christian Mangelsen, Charlotte, both of IA (US)

(73) Assignee: Genesis Systems Group, Ltd., Davenport, IA (US)

( * ) Notice: Subject to any disclaimer, the term of this patent is extended or adjusted under 35 U.S.C. 154(b) by 0 days.

(21) Appl. No.: 09/655,099

(22) Filed: Sep. 5, 2000

Related U.S. Application Data (60) Provisional application No. 60/221,951, filed on Jul. 31, 2000.

(51) Int. Cl.$^7$ ................................................ B25B 1/22
(52) U.S. Cl. ........................................ 269/71; 269/73
(58) Field of Search ................. 269/71, 73, 289 R, 269/72, 74, 20, 27; 254/122, 126

(56) References Cited

U.S. PATENT DOCUMENTS

| | | | | |
|---|---|---|---|---|
| 3,404,791 A | * | 10/1968 | Larson | 254/126 |
| 3,700,228 A | * | 10/1972 | Peale | 269/61 |
| 4,858,888 A | * | 8/1989 | Cruz et al. | 254/122 |
| 5,211,265 A | * | 5/1993 | Gregg | 254/122 |
| 5,337,875 A | * | 8/1994 | Lee | 269/289 MR |
| 5,695,173 A | * | 12/1997 | Ochoa et al. | 254/126 |
| 5,704,601 A | * | 1/1998 | Mangelsen et al. | 269/57 |

* cited by examiner

Primary Examiner—Joseph J. Hail, III
Assistant Examiner—Lee Wilson
(74) Attorney, Agent, or Firm—McKee, Voorhees & Sease, P.L.C.

(57) ABSTRACT

A dual cylinder pivotal work piece holding device includes a fixture pivotally mounted on a frame. A crank arm drives the fixture about a pivot axis. First and second cylinders have rods pivotally connected to the crank arm at a drive point offset from the fixture pivot axis. The rods form an oblique angle with each other and a controller is provided for extending and retracting the rods in a coordinated cycle so that at least one of the rods is moving at any instant during rotation of the fixture.

20 Claims, 7 Drawing Sheets

DUAL CYLINDER WORK PIECE POSITIONER

CROSS-REFERENCE TO RELATED APPLICATIONS

This application claims priority based upon U.S. Provisional Application Serial No. 60/221,951 filed Jul. 31, 2000 by Express Mail (Label # EL515382260US).

BACKGROUND OF THE INVENTION

The present invention relates generally to a positioning device, and specifically to a positioning table or fixture used for robotic automated systems. Rotary tables or fixtures carrying work objects are often used in robotic systems. An operator places the work object on one side in one workstation while a robot processes another work object on the opposing side of the fixture. The fixture then rotates in a reciprocating motion to reverse the two parts.

In order to accomplish the high-speed station exchange, the positioning device must be able to accelerate the table or fixture quickly and decelerate it quickly. If the fixture is traveling at full speed near the end of the exchange, it will have difficulty stopping and may cause damage to the system and the need for frequent repair or replacement of parts.

Other previous designs have used a flow torque control device that includes a rack and pinion driven by a singular air hydraulic cylinder. The pinion in these designs is small and does not produce much torque.

Another prior art design involves high-speed tables that use an electric motor. The problem with this type of table, however, is that the motor must be oversized to accommodate the fast acceleration and deceleration required for the table.

Additionally some prior art devices, such as that disclosed in U.S. Pat. No. 5,704,601 to Mangelsen, et al., have solved the above stated problems through the use of a singular cylinder assembly including a cylinder, a piston, and a rod carried by the piston. While the system of the '601 patent is remarkable in its solution to the above stated problems, the singular cylinder design required inertia be relied upon in order to effectuate the proper rotation of the position device. The positioning device contained a no power point, or a point at which the cylinder was incapable of exerting force upon the positioning table or fixture. It is therefore desirable to provide a positioning device that is capable of exerting force, and thereby control, over the positioning table or fixture at all points of its rotation.

There is therefore a need in the art for a reciprocating high speed positioning device which can quickly accelerate and decelerate without putting stress on the parts of the system.

It is therefore a primary objective of the present invention to provide a reciprocating high speed positioning device which can overcome the problems found in the prior art.

Another objective of the present invention is to provide a reciprocating high-speed positioning device that is powerful, yet not oversized.

A further objective of the present invention is to provide a reciprocating high-speed positioning device, which can accelerate and decelerate quickly without damaging the parts of the system.

A still further objective of the present invention is to provide a reciprocating high speed positioning device which is easy to use and economical to manufacture.

The means and method of accomplishing these and other objects will become apparent from the following description of the invention.

SUMMARY OF THE INVENTION

The forgoing objects may be achieved by reciprocating positioning device comprising a frame, a table or fixture, and a bearing assembly rotatably mounting the table or fixture to the frame for rotation about a table or fixture axis. The table or fixture axis can be horizontal, vertical, or at any particular angle that is convenient for the human or robot operator.

Dual cylinder assemblies are connected to the frame at an oblique angle with respect to each other. Each cylinder assembly includes a cylinder, a piston, and a rod carried by the piston. Each piston and rod are moveable within the respective cylinder between an extended and retracted position. Each rod is pivotally connected to the table or fixture at a pivot point spaced from the table or fixture axis. The table or fixture is rotatable from a first position wherein the first rod is in its extended position and the second rod in a partially retracted position to a second position wherein the second rod is in its extended position and the first rod in a partially retracted position.

The dual cylinder assembly allows for precise rotation of the table or fixture to any position between the first and second positions. The exact position of the table or fixture may be monitored through the use of a sensor, such as a digital encoder. The encoder provides an electrical pulse train that can be used to determine speed and direction of rotation. This allows for precise controlling of the exact table or fixture position and prevents any damage to parts of the system. Of course, it is to be understood that the procedure for rotating the table or fixture easily may be reversed and therefore the table or fixture may be rotated a full 180° in the opposite direction. Therefore, the table or fixture has a complete 180° range of motion.

A control means is connected to the dual cylinder assembly and to any sensors used so as to cause the table or fixture to move from its first position to any other desired position. The control means will extend or retract the appropriate rods as required to properly place the table or fixture in correct position.

Another feature of the invention includes an optional safety brake, which provides emergency stopping to the system. The emergency brake is automatically activated when the power system is off. The control means that powers the reciprocating turntable or fixture also provides the power to inactivate or activate the safety brake. The brake is mounted between the bearing assembly and the turntable or fixture and applies pressure, which prevents rotation of the reciprocating table or fixture assembly.

DETAILED DESCRIPTION OF THE PREFERRED EMBODIMENT

The work piece holding and positioning device of the present invention is generally shown in the figures. It can be appreciated from these drawings how a control means may operatively select a desired position and then move the positioning device so that the table or fixture will arrive at the desired position.

Figure 1:
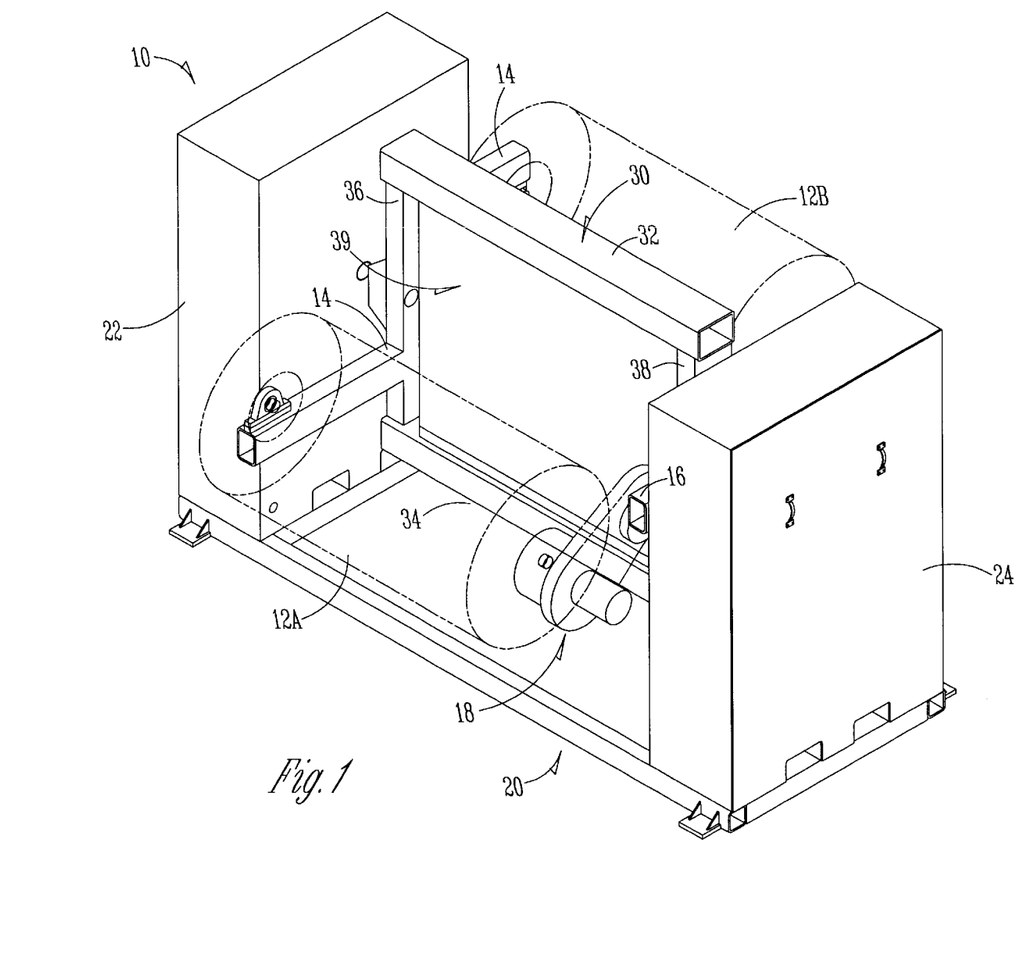
FIG. 1 is a perspective view of the pivotal work piece holding and positioning device of the present invention.
Figure 2:
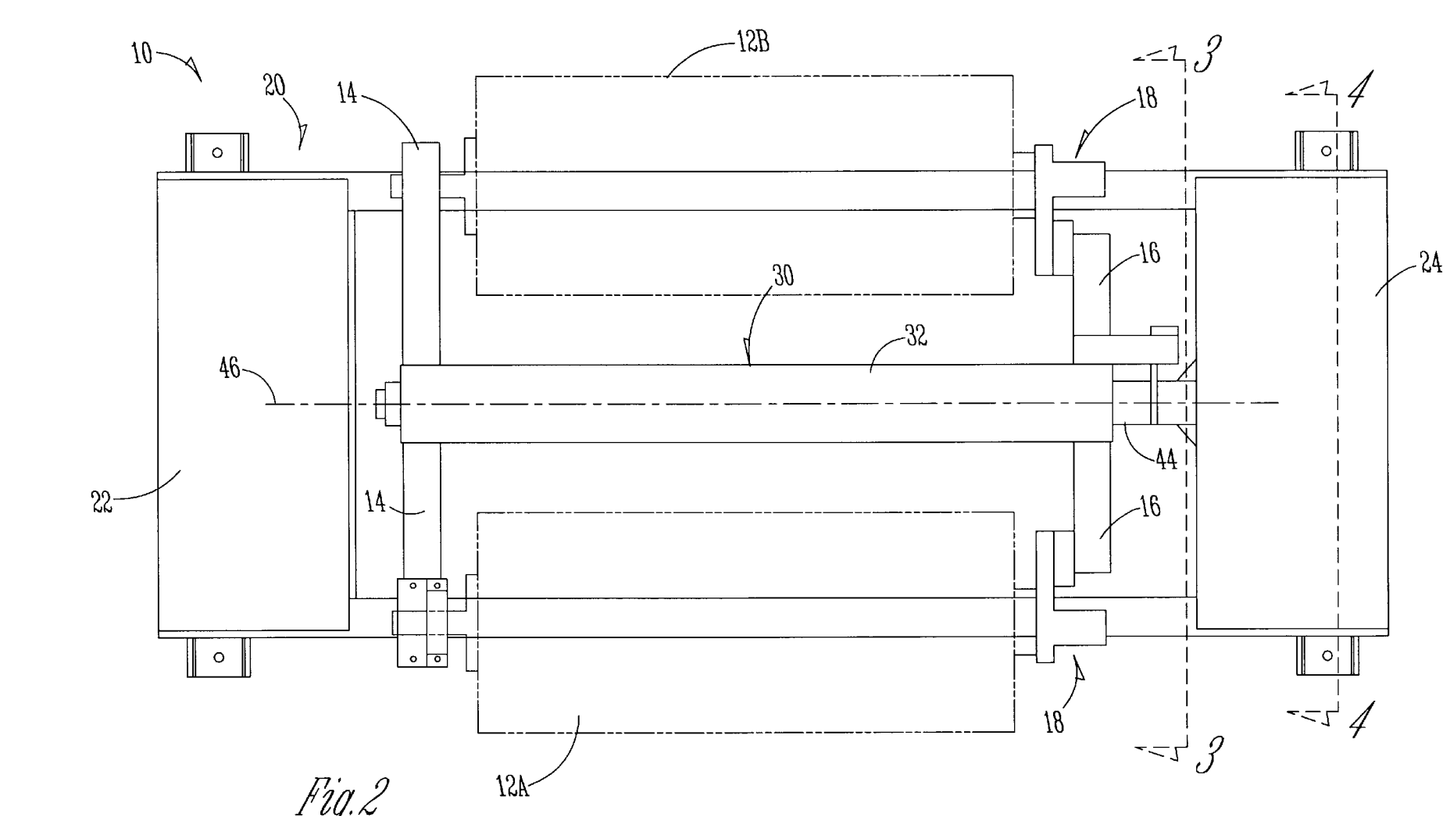
FIG. 2 is a top plan view of the device of FIG. 1.
Figure 3:
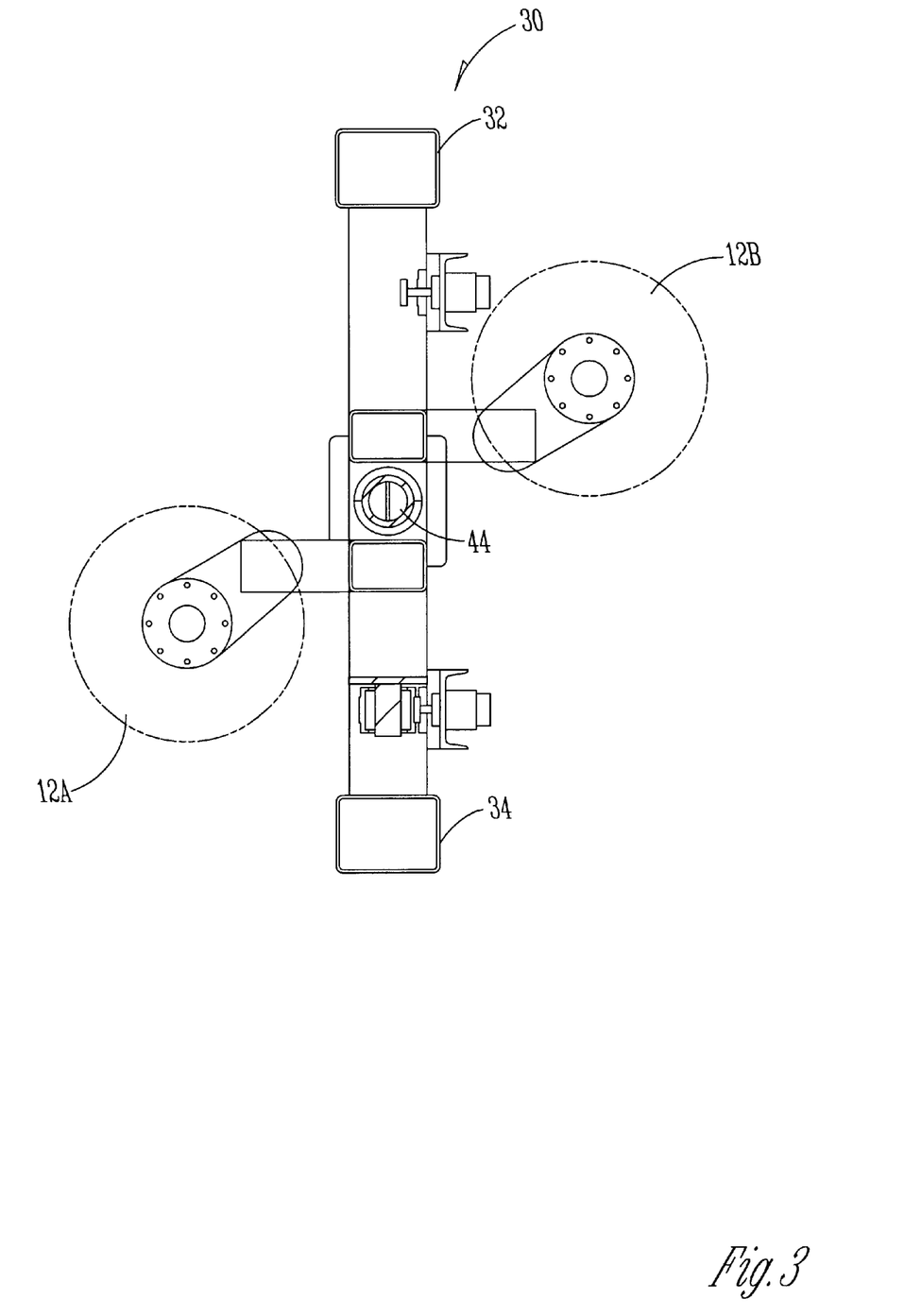
FIG. 3 is partial sectional view taken along line 3—3 in FIG. 2, which shows the fixture configuration of the device from another angle with most of the frame components omitted for simplicity and clarity.

Referring to FIGS. 1 and 2, the positioning device 10 of the present invention includes a frame 20 having one or more supports 22, 24 capable of supporting a pivotally mounted positioning table or work piece holding fixture 30 along the rotary axis 46 of the fixture or positioning table. The support 22 is generally referred to as the tailstock, and the support 24 is generally referred to as the headstock. The rotary axis 46 is shown to be horizontal, but could be vertical or at any other angle with respect to a horizontal plane without detracting from the invention.

The fixture 30 rotatably supports a pair of work piece mounting drums 12A, 12B on which work pieces (not shown) to be processed can be mounted. A pair of spaced tubular arms 14, 16 on the fixture 30 support the drums 12A, 12B. A servo motor and gearbox drive mechanism 18 mounts to each arm 16 near the headstock 24 to rotate the drums 12A, 12B about their respective longitudinal axes. The fixture 30 has a framework that includes a pair of longitudinal tubular members 32, 34 connected together by a pair of tubular end members 36, 38 so as to define a space 39 therebetween.

Figure 4:
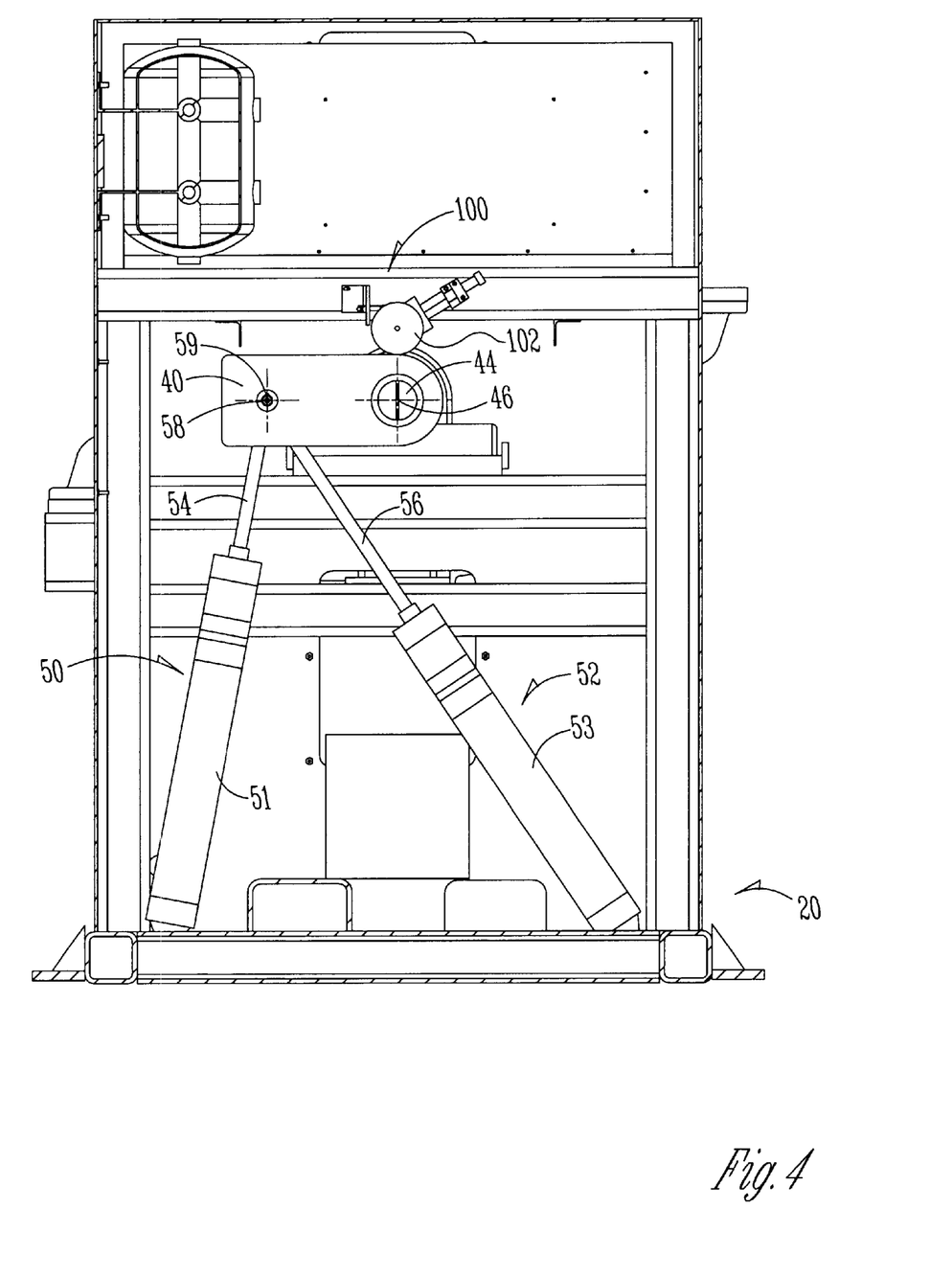
FIG. 4 is a sectional view taken along line 4—4 in FIG. 2 and shows the dual cylinders and crank arm of this invention in a first position.
Figure 5:
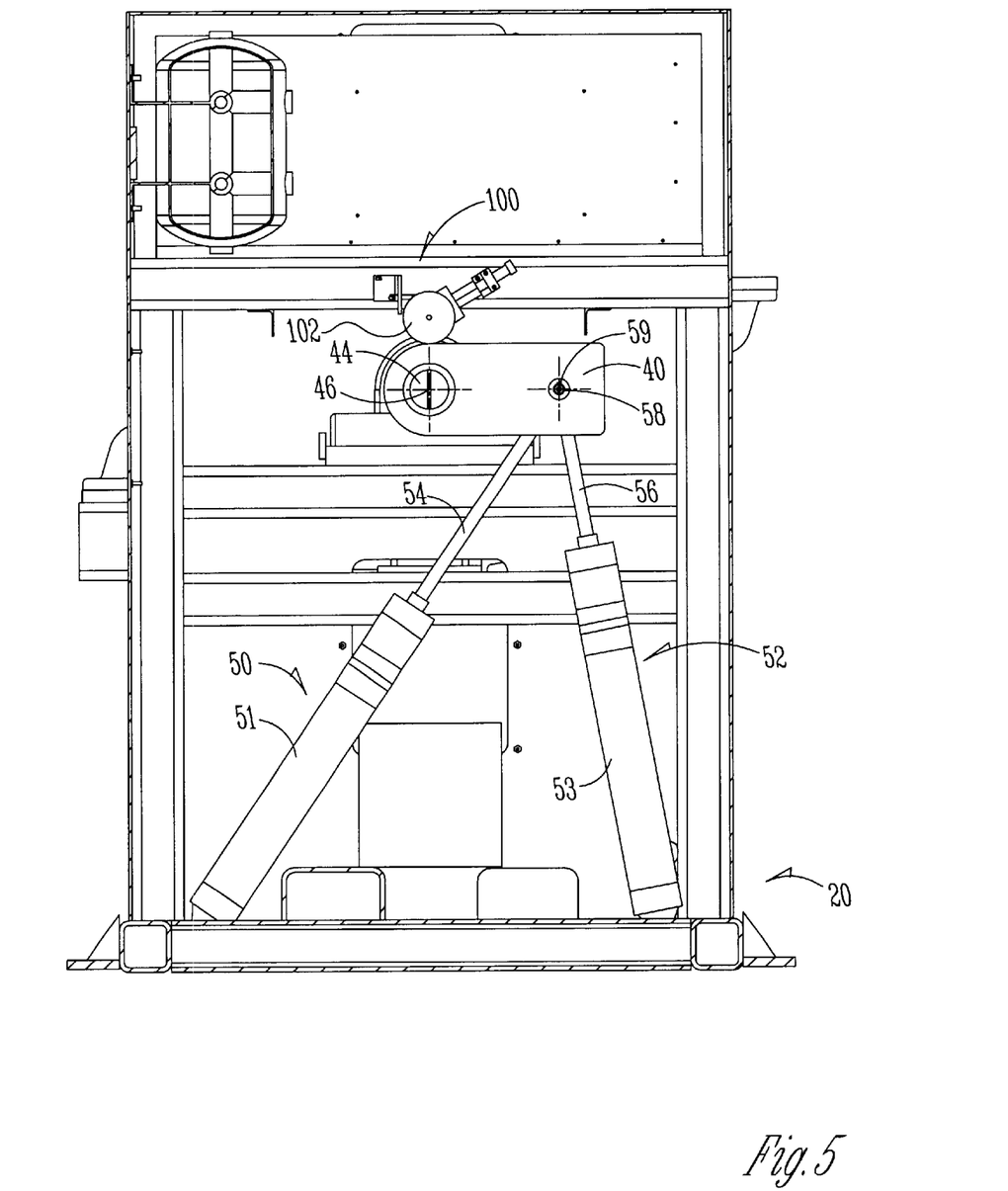
FIG. 5 is a sectional view similar to FIG. 4, but shows the dual cylinders and crank arm of this invention in a second position.
Figure 6:
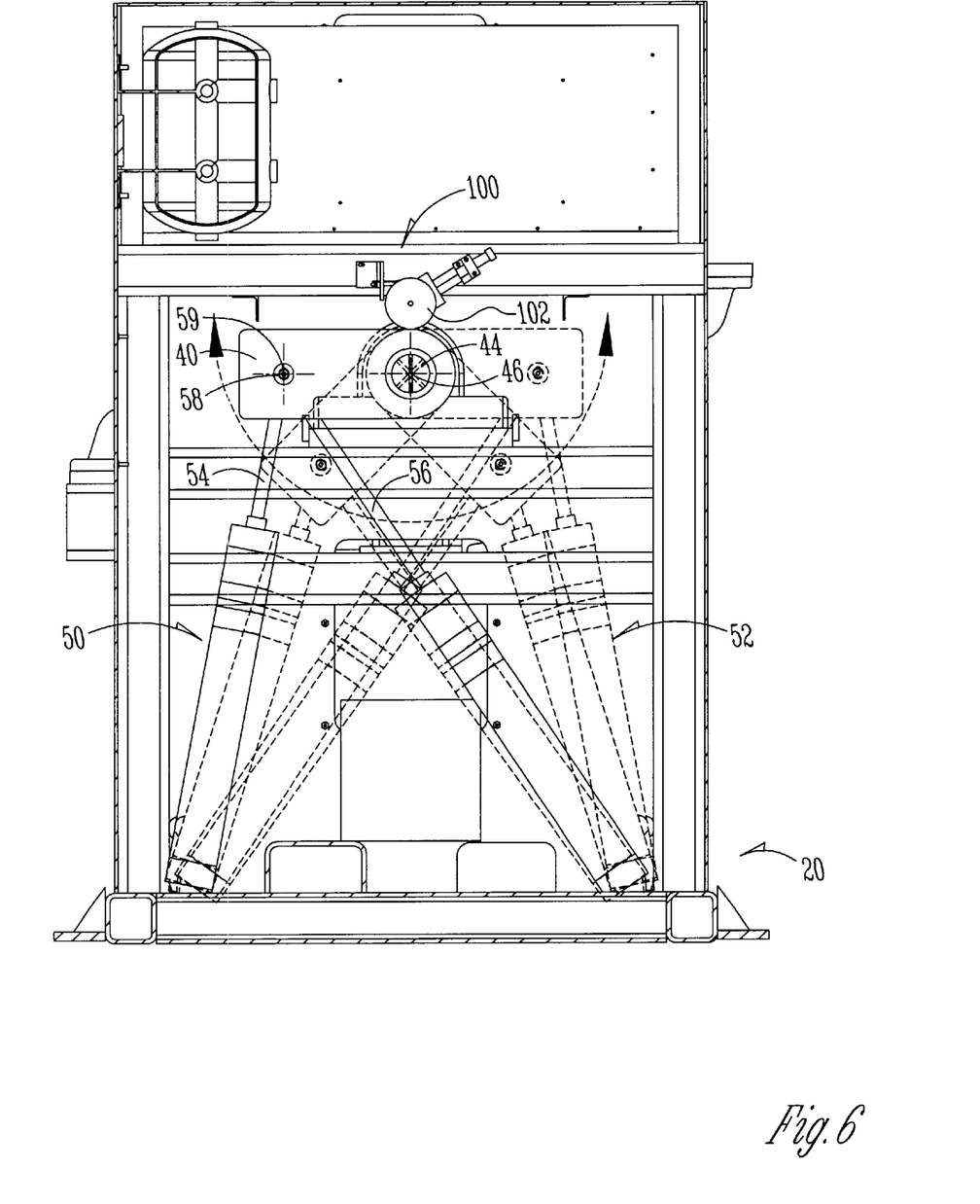
FIG. 6 is a view similar to FIGS. 4 and 5 and shows the movement of the crank arm between the first and second positions by the dual cylinders of this invention.

Referring to FIGS. 4–6, a crank arm 40 secures to a shaft 44 that pivotally mounts the positioning fixture 30 to the frame 20 at one of the end members 38. Thus, the positioning fixture 30 secures to the shaft 44 so as to rotate therewith when the crank arm 40 is rotated. The central longitudinal axis of the shaft 44 defines the pivot axis 46 of the fixture. The movement of the shaft 44 in FIGS. 4–6 illustrates the movement of the fixture 30, which is hidden by the inside wall of the headstock 24.

A pair of cylinder assemblies 50, 52 includes cylinders 51, 53 with one end pivotally connected to the frame 20 and a rod 54, 56 that pivotally connects to the crank arm 40 at a drive point 58 to define a pivot axis 59 offset from and parallel to the pivot axis 46. The cylinder assemblies 50, 52 and their rods 54, 56 are mounted at an oblique angle with respect to each other. In the embodiment shown, the crank arm 40 and the fixture 30 attached thereto can be rotated 180° around the axis 46.

Precise control of the pivotal movement of the fixture 30 is achieved through the use of a speed and position sensor 100. The sensor 100 is mounted on the frame 20 and directed toward the crank arm 40. Although other types of sensors will suffice, the sensor 100 is preferably a digital encoder with a rotatable wheel 102 that contacts an arcuate surface 60 on the crank arm 40 to generate an electrical signal indicative of the speed and position of the fixture 30. The arcuate surface 60 is disposed a constant radial distance from and parallel to the fixture pivot axis 46. For ease of mounting the sensor 100, the preferred location of the arcuate surface 60 is offset from the pivot axis 46 in a direction opposite from the drive point 58.

Figure 7:
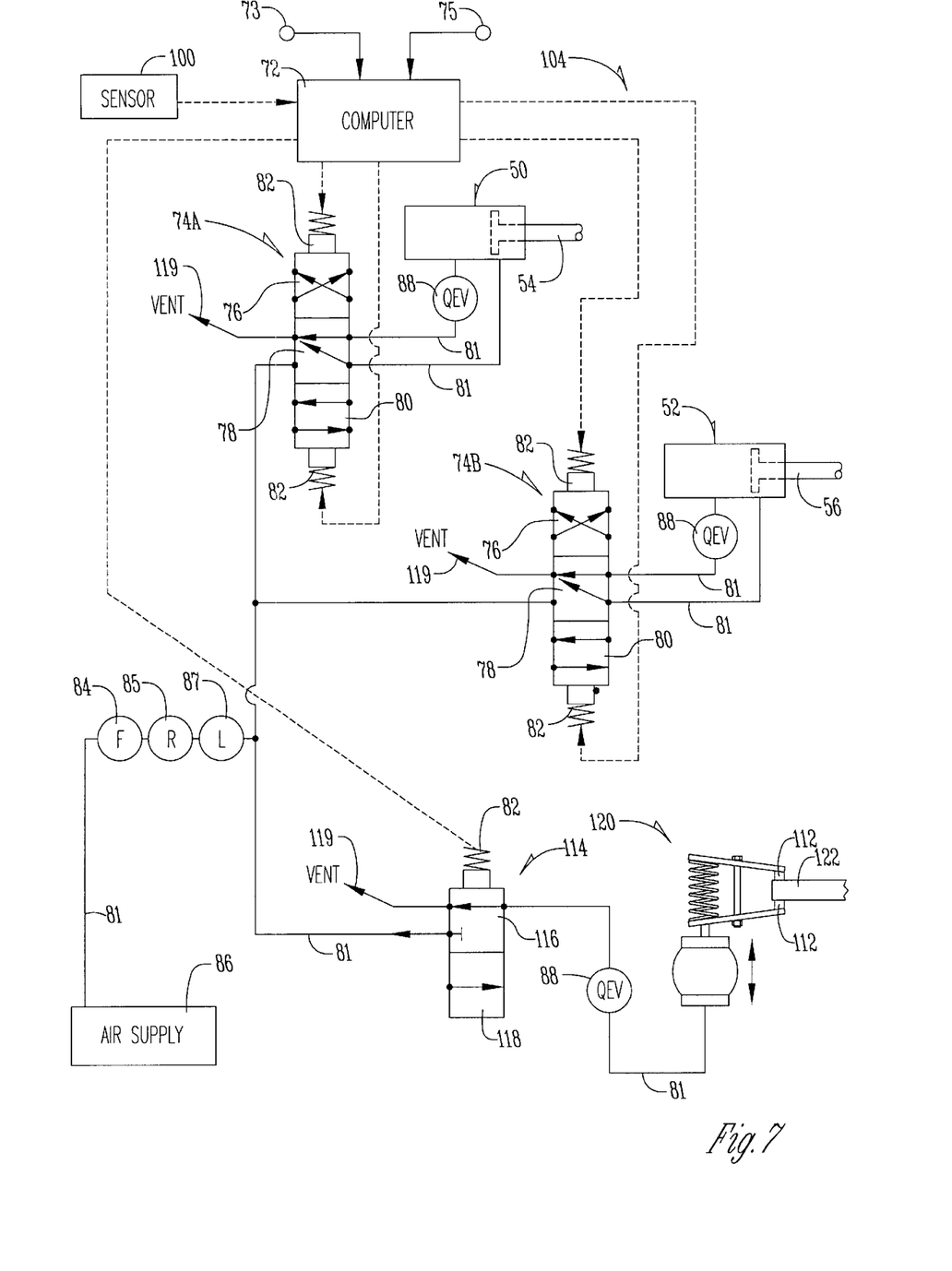
FIG. 7 is a schematic diagram of the control means used to operate the dual cylinder work piece positioner of this invention.

As shown in the schematic diagram of FIG. 7, the sensor 100 is electrically connected to a control means or assembly 104, which controls the cylinder assemblies 50, 52 based upon speed and position signals from the sensor 100. The control assembly 104 includes a programmable computer or microprocessor 72 that is also connected to an index button 73 and a cycle start button 75. Index button 73 signals the computer 72 to move the fixture 30 a single time by a fixed amount, such as 180 degrees. Cycle button 75 signals the computer 72 to initiate an automatic reciprocation of the fixture 30 each time the robotic equipment completes its work on the work piece. The connection of the computer 72 to the robotic equipment is not shown, but is well known.

The control assembly is preferably an electronically controlled pneumatic power means. The computer 72 electrically connects to the solenoids 82 of a pair of three-position four-port valves 74A, 74B so as to independently control the respective cylinder assemblies 50, 52 through air lines 81 and quick exhaust valves (QEV) 88. An air supply source 86 provides air to the supply port of the valves 74A, 74B through an air line 81, a filter 84 (F), a regulator 85 (R), and a lubricator 87 (L). A vent 119, a two-position brake valve 114, and a brake 120 are also provided. The brake 120 can take a variety of forms, including but not limited to an air brake with pads 112 that grip a disc 122 that is secure to the fixture 30 for rotation therewith.

FIG. 4 illustrates how, in operation, the fixture starts in a first position. Actuation of either button 73 or button 75 causes the computer 72 to activate the appropriate solenoid 82 on the valve 74B so as to move the valve 74B into its third position 80. In response, the rods 54, 56 of both cylinders 50, 52 retract. Rod 56 is powered and valve 74A is vented in its second position 78 so that rod 54 merely follows and retracts, too. The fixture 30 attached to the crank arm 40 swings downwardly in a counterclockwise direction, as shown in FIG. 6.

The wheel 102 of the sensor 100 rotates as the crank arm 40 swings and sends a signal in the form of a pulse train of signals over time to the computer 72, which indicates the position and speed of the fixture 30. Based upon the signal from the sensor 100, the computer 72 initiates phases of the cylinder power cycle at the appropriate positions or times. During this second phase, which is initiated before the second rod 56 is fully retracted, the computer 72 activates the appropriate solenoids 82 so that the valve 74A moves to its first position 76 wherein the rod 54 is powered to extend. The computer 72 commands the valve 74B into its vented second position 78 wherein the rod 56 is carried by the rod 54 through further retraction and then extension.

One skilled in the art will appreciate that the command signals from the computer 72 to the valves 74A and 74B are preferably overlapped in time. This prevents the occurrence of a null point in the cycle where neither of the cylinders 50, 52 are powered. During the normal null point for the individual cylinders 50 or 52, the other cylinder 52 or 50 is always powered. Thus, the overall effect is to eliminate the null point or no power point, thereby providing more direct and reliable control of fixture movement. The computer 72 could also be programmed to power both cylinders 50, 52 for concurrent retraction or extension.

As the crank arm 40 approaches the second position, which is shown in the example of FIG. 5 to be 180 degrees from the first position, the computer signals the brake valve 114 to move from the second position 118 to the first position 116. This activates the brake 120 to hold the crank arm 40 in place. The computer 72 signals the valves 74A, 74B to the second (vented) position 78. The brake 120 is released and the cylinder power cycle repeated in reverse to return the fixture 30 to the first position if desired, of course, the brake 120 can also be used as an emergency brake to stop the fixture at any time.

Thus, the present invention at least satisfies its stated objectives.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as defined in the following claims.

What is claimed is:

1. A pivotal work piece holding device comprising: a frame;
    a work piece holding fixture pivotally mounted to the frame for rotation about a fixture pivot axis between a first position and a second position;
    a crank arm connected to the fixture;
    a first cylinder assembly including a first cylinder and a first piston rod movable within the first cylinder between extended and retracted positions, the first cylinder being pivotally connected to the frame and the first rod being pivotally connected to the crank arm at a drive point offset from the fixture pivot axis;
    a second cylinder assembly including a second cylinder and a second piston rod movable within the second cylinder between extended and retracted positions, the second cylinder being pivotally connected to the frame and the second rod of the second cylinder assembly being pivotally connected to the crank arm at the drive point so as to form an oblique angle with the first rod in both the first and second positions of the fixture; and
    control means connected to the first and second cylinder assemblies for forcibly and independently moving the first rod and the second rod between extended and retracted positions in a coordinated cycle such that the fixture rotates with respect to the frame and at least one of the first and second rods is being forcibly moved by the control means at any instant during rotation of the fixture.

2. A pivotal work piece holding device comprising:
    a frame;
    a work piece holding fixture pivotally mounted to the frame for rotation about a fixture pivot axis between a first position and a second position;
    a crank arm connected to the fixture;
    a first cylinder assembly including a first cylinder and a first piston rod movable within the first cylinder between extended and retracted positions, the first cylinder being pivotally connected to the frame and the first rod being pivotally connected to the crank arm at a drive point offset from the fixture pivot axis;
    a second cylinder assembly including a second cylinder and a second piston rod movable within the second cylinder between extended and retracted positions, the second cylinder being pivotally connected to the frame and the second rod of the second cylinder assembly being pivotally connected to the crank arm at the drive point so as to form an oblique angle with the first rod in both the first and second positions of the fixture; and
    control means connected to the first and second cylinder assemblies for forcibly and independently moving the first rod and the second rod between extended and retracted positions in a coordinated cycle such that the fixture rotates with respect to the frame and at least one of the first and second rods is being forcibly moved by the control means at any instant during rotation of the fixture;
    the rods of the first and second cylinders being connected to the crank arm along a pivot axis extending through the drive point and parallel to the fixture axis.

3. The device of claim 2 wherein the crank arm includes an arcuate surface thereon offset a constant radial distance from and extending parallel to the fixture axis.

4. The device of claim 3 wherein the arcuate surface is offset from the fixture axis in a direction opposite from the drive point.

5. The device of claim 3 comprising a sensor for sensing speed and position of the fixture with respect to the frame, the sensor being connected to the control means and being directed toward the arcuate surface so as to generate signals to the control means indicative of the speed and position of the fixture.

6. The device of claim 5 wherein the sensor is a digital encoder.

7. The device of claim 6 wherein the digital encoder includes a wheel rotatably mounted on the frame and contacting the arcuate surface of the crank arm, whereby the wheel rotates at a speed proportional to the fixture and thereby causes the sensor to generate an electrical signal to the controller.

8. The device of claim 2 wherein the control means includes a programmable computer.

9. The device of claim 2 wherein the control means includes pneumatic power means for operating the first and second cylinder assemblies.

10. The device of claim 2 wherein the control means includes a brake.

11. The device of claim 2 wherein the fixture pivot axis is horizontal.

12. A pivotal work piece holding device comprising:
    a frame;
    a work piece holding fixture pivotally mounted to the frame for rotation about a fixture pivot axis between a first position and a second position;
    a crank arm connected to the fixture;
    a first cylinder assembly including a first cylinder and a first piston rod movable within the first cylinder between extended and retracted positions, the first cylinder being pivotally connected to the frame and the first rod being pivotally connected to the crank arm at a drive point offset from the fixture pivot axis;
    a second cylinder assembly including a second cylinder and a second piston rod movable within the second cylinder between extended and retracted positions, the second cylinder being pivotally connected to the frame and the second rod of the second cylinder assembly being pivotally connected to the crank arm at the drive point so as to form an oblique angle with the first rod in both the first and second positions of the fixture; and
    control means connected to the first and second cylinder assemblies for forcibly and independently moving the first rod and the second rod between extended and retracted positions in a coordinated cycle such that the fixture rotates with respect to the frame and at least one of the first and second rods is being forcibly moved by the control means at any instant during rotation of the fixture;

the fixture being generally rectangular and includes opposite ends and opposing sides, at least one of the ends being pivotally connected to the frame and each of the opposing sides including a workpiece locating station mounted thereon.

13. A pivotal work piece holding device comprising:

a frame;

a work piece holding fixture pivotally mounted to the frame for rotation about a fixture pivot axis between a first position and a second position;

a crank arm connected to the fixture;

a first cylinder assembly including a first cylinder and a first piston rod movable within the first cylinder between extended and retracted positions, the first cylinder being pivotally connected to the frame and the first rod being pivotally connected to the crank arm at a drive point offset from the fixture pivot axis;

a second cylinder assembly including a second cylinder and a second piston rod movable within the second cylinder between extended and retracted positions, the second cylinder being pivotally connected to the frame and the second rod of the second cylinder assembly being pivotally connected to the crank arm at the drive point so as to form an oblique angle with the first rod in both the first and second positions of the fixture; and control means connected to the first and second cylinder assemblies for forcibly and independently moving the first rod and the second rod between extended and retracted positions in a coordinated cycle such that the fixture rotates with respect to the frame and at least one of the first and second rods is being forcibly moved by the control means at any instant during rotation of the fixture;

the first position of the fixture and the second position of the fixture being 180 degrees apart.

14. A pivotal work piece holding device comprising:

a frame;

a work piece holding fixture pivotally mounted to the frame for rotation about a fixture pivot axis between a first position and a second position;

a crank arm connected to the fixture;

a first cylinder assembly including a first cylinder and a first piston rod movable within the first cylinder between extended and retracted positions, the first cylinder being pivotally connected to the frame and the first rod being pivotally connected to the crank arm at a drive point offset from the fixture pivot axis;

a second cylinder assembly including a second cylinder and a second piston rod movable within the second cylinder between extended and retracted positions, the second cylinder being pivotally connected to the frame and the second rod of the second cylinder assembly being pivotally connected to the crank arm at the drive point so as to form an oblique angle with the first rod in both the first and second positions of the fixture; and control means connected to the first and second cylinder assemblies for forcibly and independently moving the first rod and the second rod between extended and retracted positions in a coordinated cycle such that the fixture rotates with respect to the frame and at least one of the first and second rods is being forcibly moved by the control means at any instant during rotation of the fixture;

the fixture having a framework that includes a pair of longitudinal members connected by a pair of end members so as to define a space therebetween.

15. The device of claim 14 wherein the framework includes a first pair of arms extending in opposite directions from one of the end members and a second pair of arms extending in opposite directions from the other end member of the pair of end members.

16. A pivotal work piece holding device comprising:

a frame;

a work piece holding fixture pivotally mounted to the frame for rotation about a fixture pivot axis between a first position and a second position;

a crank arm connected to the fixture;

a first cylinder assembly including a first cylinder and a first piston rod movable within the first cylinder between extended and retracted positions, the first cylinder being pivotally connected to the frame and the first rod being pivotally connected to the crank arm at a drive point offset from the fixture pivot axis;

a second cylinder assembly including a second cylinder and a second piston rod movable within the second cylinder between extended and retracted positions, the second cylinder being pivotally connected to the frame and the second rod of the second cylinder assembly being pivotally connected to the crank arm at the drive point so as to form an oblique angle with the first rod in both the first and second positions of the fixture; and control means connected to the first and second cylinder assemblies for forcibly and independently moving the first rod and the second rod between extended and retracted positions in a coordinated cycle such that the fixture rotates with respect to the frame and at least one of the first and second rods is being forcibly moved by the control means at any instant during rotation of the fixture;

the cycle including a first phase in which the control means retracts the second rod for a first period of time, and a second phase in which the control means extends the first for a second period of time, the first period of time and the second period of time being overlapped so as to prevent an overall no power point from occurring in the cycle.

17. A pivotal work piece holding device comprising:

a frame;

a work piece holding fixture pivotally mounted to the frame for rotation about a fixture pivot axis;

a crank arm drivingly connected to the fixture;

a first cylinder assembly including a first cylinder and a first piston rod movable within the first cylinder between extended and retracted positions, the first cylinder being pivotally connected to the frame and the first rod being pivotally connected to the crank arm at a drive point offset from the pivot axis;

a second cylinder assembly including a second cylinder and a second piston rod movable within the second cylinder between extended and retracted positions, the second cylinder being pivotally connected to the frame and the second rod of the second cylinder assembly being pivotally connected to the crank arm at the drive point so as to form an oblique angle with the first rod;

control means connected to the first and second cylinder assemblies for forcibly moving the first rod and the second rod between extended and retracted positions in a coordinated cycle such that the fixture rotates with respect to the frame and at least one of the first and second rods is moving at any instant during rotation of the fixture; and a sensor for sensing speed and position of the fixture with respect to the frame, the sensor being connected to the control means so as to generate signals to the control means indicative of the speed and position of the fixture.

18. The device of claim 17 wherein the sensor is a digital encoder.

19. The device of claim 18 wherein the digital encoder includes a wheel rotatably mounted on the frame and contacting the crank arm such that the wheel rotates at a speed that is proportional to the rotation of the fixture and thereby generates an electrical pulse train signal indicative of the speed and position to the controller.

20. A method of pivoting a fixture about a fixture pivot axis on a frame from a first position to a second position comprising the steps of:

providing first and second cylinders connected to the frame, the first and second cylinders having extendible and retractable first and second rods respectively connected to a common drive point on a crank arm connected to the fixture such that the drive point is offset from the fixture pivot axis, the rods forming an oblique angle to each other;

providing control means for extending and retracting the rods;

retracting the second rod to initiate pivotal movement of the fixture from a first position of the fixture; and before the second rod is fully retracted, extending the first rod to continue pivotal movement of the fixture to the second position.

* * * * *